US009804431B2

(12) United States Patent
Park et al.

(10) Patent No.: US 9,804,431 B2
(45) Date of Patent: Oct. 31, 2017

(54) OPTICAL FILM AND DISPLAY DEVICE INCLUDING THE SAME

(71) Applicant: SAMSUNG DISPLAY CO., LTD., Yongin-si, Gyeonggi-do (KR)

(72) Inventors: Seunghyun Park, Seoul (KR); Sungin Ro, Hwaseong-si (KR); Junho Song, Seongnam-si (KR); Seah Kwon, Seoul (KR); Sungjin Kim, Seongnam-si (KR); Youngjin Park, Suwon-si (KR); Ocksoo Son, Seoul (KR); Yeogeon Yoon, Suwon-si (KR); Jaehak Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/373,716

(22) Filed: Dec. 9, 2016

(65) Prior Publication Data

US 2017/0235184 A1    Aug. 17, 2017

(30) Foreign Application Priority Data

Feb. 15, 2016    (KR) .................. 10-2016-0017499

(51) Int. Cl.
  *C08F 2/48* (2006.01)
  *G02F 1/1335* (2006.01)
  *G02B 5/02* (2006.01)

(52) U.S. Cl.
  CPC ..... *G02F 1/133504* (2013.01); *G02B 5/0236* (2013.01); *G02B 5/0268* (2013.01); *G02B 5/0278* (2013.01); *G02F 1/133553* (2013.01); *G02F 2001/133562* (2013.01); *G02F 2203/03* (2013.01)

(58) Field of Classification Search
  CPC ........... G02F 1/133504; G02B 5/0236; G02B 5/0268
  See application file for complete search history.

(56) References Cited

U.S. PATENT DOCUMENTS 7,452,604 B2    11/2008    Takagi et al.
2010/0062174 A1    3/2010    Shiojiri et al.

FOREIGN PATENT DOCUMENTS

| JP | 2005275201 A | 10/2005 |
| JP | 2010058436 A | 3/2010 |
| JP | 2013019988 A | 1/2013 |
| KR | 1020050006047 A | 1/2005 |

OTHER PUBLICATIONS

Kentaro Kusama et al., Design of Light Diffusion Film with Bent Structure for Reflective Displays, 2015, 4 pages, vol. 46, Issue 1, SID Symposium Digest of Technical Papers.

*Primary Examiner* — Joseph L Williams
(74) *Attorney, Agent, or Firm* — Cantor Colburn LLP

(57) ABSTRACT

An optical film includes: a light-transmissive matrix having a plate shape; a plurality of first rods having a refractive index different from a refractive index of the light-transmissive matrix and disposed at a first inclination angle in the light-transmissive matrix; and a plurality of second rods having a refractive index different from the refractive index of the light-transmissive matrix and disposed at a second inclination angle in the light-transmissive matrix. The first inclination angle is different from the second inclination angle.

16 Claims, 8 Drawing Sheets

OPTICAL FILM AND DISPLAY DEVICE INCLUDING THE SAME

This application claims priority to Korean Patent Application No. 10-2016-0017499, filed on Feb. 15, 2016, and all the benefits accruing therefrom under 35 U.S.C. §119, the content of which in its entirety is herein incorporated by reference.

BACKGROUND

1. Field

Exemplary embodiments of the invention relate to an optical film and a display device including the optical film, and more particularly, to an optical film with improved light directivity, light diffusivity, and blurring prevention characteristics and to a display device including the optical film.

2. Description of the Related Art

In recent times, display devices that display an image using display panels, such as a liquid crystal display ("LCD") panel, a plasma display panel ("PDP"), an electroluminescence ("EL") panel and an organic light emitting diode ("OLED") display panel, are garnering attention.

A display device typically includes an optical film to improve optical characteristics. The optical film may include a light diffusion film, a light direction film, and a light control film, for example.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments of the invention are directed to an optical film with improved light directivity and light diffusivity. Exemplary embodiments of the invention are also directed to an optical film having blurring prevention characteristics.

Further, exemplary embodiments are directed to a display device including the optical film.

According to an exemplary embodiment, an optical film includes: a light-transmissive matrix having a plate shape; a plurality of first rods having a refractive index different from a refractive index of the light-transmissive matrix and disposed at a first inclination angle in the light-transmissive matrix; and a plurality of second rods having a refractive index different from the refractive index of the light-transmissive matrix and disposed at a second inclination angle in the light-transmissive matrix. In such an embodiment, the first inclination angle is different from the second inclination angle.

In an exemplary embodiment, the first inclination angle may be an angle of a major axis of the first rods with respect to a normal line of the light-transmissive matrix, the second inclination angle may be an angle of a major axis of the second rods with respect to the normal line of the light-transmissive matrix, and the first inclination angle may be in a range of about zero (0) degree (°) to about 5° and the second inclination angle may be in a range of about 5° to about 20°.

In an exemplary embodiment, the light-transmissive matrix may have a thickness in a range of about 100 micrometers (μm) to about 200 μm.

In an exemplary embodiment, each of the plurality of first rods and the plurality of second rods may extend from a surface of the light-transmissive matrix to an opposing surface thereof.

In an exemplary embodiment, a difference between the refractive index of the light-transmissive matrix and the first rod may be in a range of about 0.001 to about 0.5, and a difference between the refractive index of the light-transmissive matrix and the refractive index of the second rod may be in a range of about 0.001 to about 0.5.

In an exemplary embodiment, the refractive index of the first rods and the refractive index of the second rods may be the same as each other.

In an exemplary embodiment, the first rod may include a same material as a material of the second rod.

In an exemplary embodiment, each of the first rods and the second rods may have a transverse width in a range of about 1 μm to about 3 μm.

In an exemplary embodiment, the first rods and the second rods may be arranged in a matrix form, the first rods may be arranged in a row, and the plurality of second rods may be arranged in an adjacent row.

In an exemplary embodiment, the first rods may have a pitch in a range of about 3 μm to about 5 μm.

In an exemplary embodiment, the first rods and the second rods may be disposed alternately with each other along a predetermined direction.

According to another exemplary embodiment, a method of manufacturing an optical film includes: coating a photopolymerizable composition on a base; and irradiating light to the photopolymerizable composition using a light source and curing the photopolymerizable composition. In such an embodiment, the light source includes a first light irradiating apparatus and a second light irradiating apparatus, each of the first light irradiating apparatus and the second light irradiating apparatus irradiates a plurality of dot-type collimated lights, the first light irradiating apparatus irradiates the dot-type collimated lights to the photopolymerizable composition, and the dot-type collimated lights irradiated from the first light irradiating apparatus has an irradiation angle different from an irradiation angle of the dot-type collimated lights irradiated from the second light irradiating apparatus.

In an exemplary embodiment, the dot-type collimated lights irradiated from the first light irradiating apparatus may have an inclination angle in a range of about 0° to about 5° with respect to a normal line of a surface of the photopolymerizable composition, and the dot-type collimated lights irradiated from the second light irradiating apparatus may have an inclination angle in a range of about 5° to about 20° with respect to the normal line of the surface of the photopolymerizable composition.

In an exemplary embodiment, the photopolymerizable composition may include a polyfunctional monomer, a monofunctional monomer, a non-polymerizable compound, and a photopolymerization initiator.

According to another exemplary embodiment, a display device includes: a first substrate; a second substrate opposing the first substrate; a liquid crystal layer between the first substrate and the second substrate; and an optical film on a surface of the second substrate to be opposite to the first substrate. In such an embodiment, the optical film includes: a light-transmissive matrix having a plate shape and having a first refractive index; a plurality of first rods having a second refractive index, which is different from the first refractive index, and dispersed in the light-transmissive matrix; and a plurality of second rods having a third refractive index, which is different from the first refractive index, and dispersed in the light-transmissive matrix, and the first rod and the second rod have different inclination angles with respect to a normal line of the light-transmissive matrix.

In an exemplary embodiment, the display device may further include a reflection layer on the first substrate to be opposite to the liquid crystal layer.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features of the disclosure of invention will be more clearly understood from the following detailed description taken in conjunction with the accompanying drawings, in which.

DETAILED DESCRIPTION

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, certain elements or shapes may be illustrated in an enlarged manner or in a simplified manner to better illustrate the invention, and other elements in an actual product may also be omitted. Thus, the drawings are intended to facilitate the understanding of the invention.

When a layer, area, or plate is referred to as being "on" another layer, area, or plate, it may be directly on the other layer, area, or plate, or intervening layers, areas, or plates may be therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, exemplary embodiments of the invention will be described with reference to the accompanying drawings.

Figure 1:
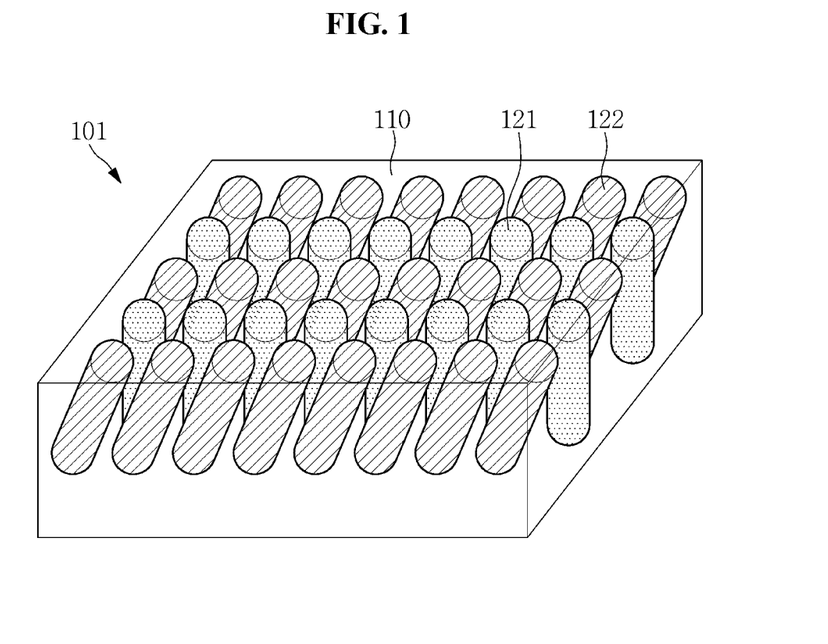
FIG. 1 is a perspective view illustrating an exemplary embodiment of an optical film.
Figure 2:
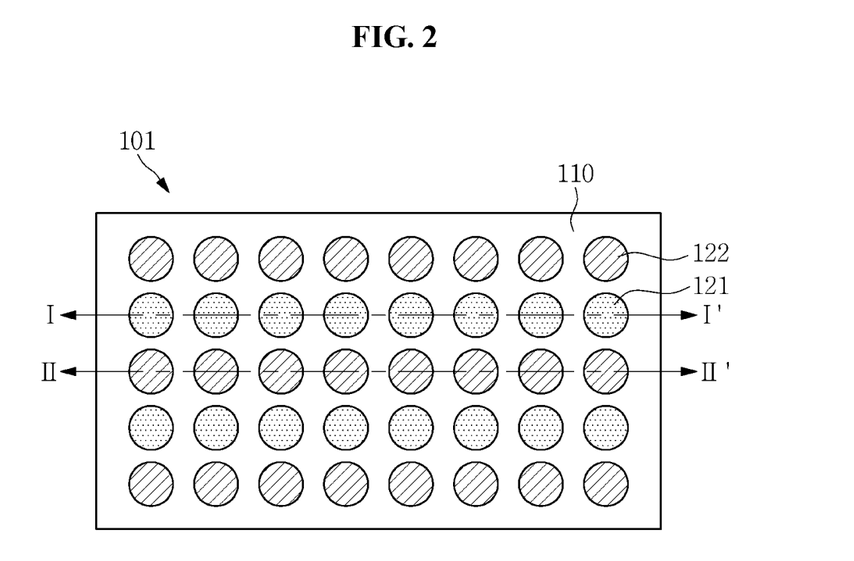
FIG. 2 is a plan view illustrating the optical film of FIG. 1.
Figure 3A:
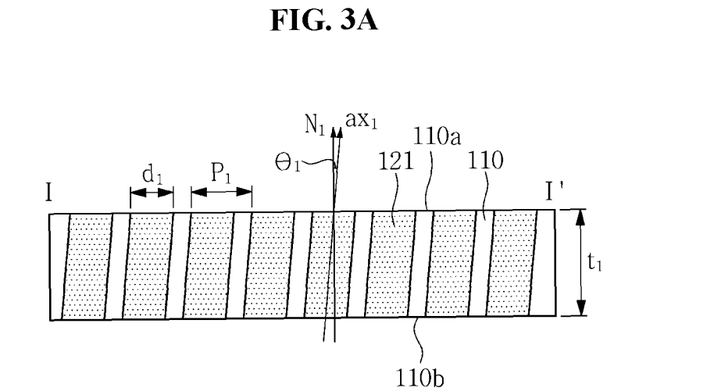
FIG. 3A is a cross-sectional view taken along line I-I' of FIG. 2.
Figure 3B:
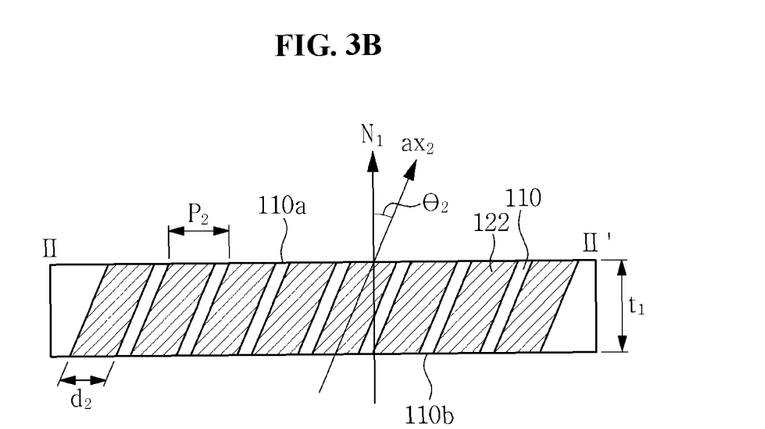
FIG. 3B is a cross-sectional view taken along line II-II' of FIG. 2.

FIG. 1 is a perspective view illustrating an exemplary embodiment of an optical film 101, FIG. 2 is a plan view illustrating the optical film 101 of FIG. 1, FIG. 3A is a cross-sectional view taken along line I-I' of FIG. 2, and FIG. 3B is a cross-sectional view taken along line II-II' of FIG. 2.

As shown in FIG. 1, an exemplary embodiment of the optical film 101 includes a light transmissive matrix 110 having a plate shape, a plurality of first rods 121 having a refractive index different from a refractive index of the light transmissive matrix 110 and arranged at a first inclination angle θ1 in the light transmissive matrix 110, and a plurality of second rods 122 having a refractive index different from the refractive index of the light transmissive matrix 110 and arranged at a second inclination angle θ2 in the light transmissive matrix 110.

The first rods 121 and the second rods 122 may each have a rod shape or a pillar shape. In an exemplary embodiment, the first rods 121 and the second rods 122 may have a circular pillar shape, e.g., a cylinder shape. In an alternative exemplary embodiment, the first rods 121 and the second rods 122 may have an angled pillar shape, e.g., a prism shape.

According to an exemplary embodiment, the plurality of first rods 121 and the plurality of second rods 122 are disposed substantially in a matrix form. In an exemplary embodiment, the first rods 121 are disposed in a row along one direction, and the second rods 122 are disposed in another row adjacent to the first rods 121 along the one direction. Referring to FIGS. 1 and 2, in an exemplary embodiment, the first rods 121 and the second rods 122 are disposed in rows, respectively, along a row direction. In an exemplary embodiment, a row of the first rods 121 and a row of the second rods 122 are alternately disposed with each other along a column direction.

The first rods 121 have a first inclination angle θ1 and are aligned in a predetermined direction in the light transmissive matrix 110. The second rods 122 have a second inclination angle θ2 and are aligned in a predetermined direction in the light transmissive matrix 110.

According to an exemplary embodiment, the first inclination angle θ1 is defined as an angle of a major axis ax1 of the first rod 121 with respect to a normal line N1 of the light transmissive matrix 110, and the second inclination angle θ2 is defined as an angle of a major axis ax2 of the second rod 122 with respect to the normal line N1 of the light transmissive matrix 110.

In such an embodiment, the first rod 121 and the second rod 122 may have different inclination angles from each other with respect to the normal line N1 of a surface 110a (e.g., a top surface) of the light transmissive matrix 110. In such an embodiment, the first inclination angle θ1 and the second inclination angle θ2 have different values, that is, θ1≠θ2.

In one exemplary embodiment, for example, the first rod 121 has the first inclination angle θ1 in a range of about zero (0) degree (°) to about 5°, and the second rod 122 has the second inclination angle θ2 in a range of about 5° to about 20°.

The first rod 121 induces light propagation in the first inclination angle θ1, and the second rod 122 induces light propagation in the second inclination angle θ2. Accordingly, the optical film 101 has light directivity.

In such an embodiment, the first rod 121 and the second rod 122 have refractive indices that are different from a refractive index of the light transmissive matrix 110, and thus light incident to the optical film 101 may be scattered at the first rod 121 and the second rod 122. Accordingly, the optical film 101 may have light scattering characteristics.

The first rod 121 and the second rod 122 may have the same refractive index as each other, and may have different refractive indices from each other.

In the case that a refractive-index difference among the light transmissive matrix 110 and the first and the second rods 121 and 122 is too small, the light scattering characteristics of the optical film 101 may be too low. In the case that the refractive-index difference among the light transmissive matrix 110 and the first and the second rods 121 and 122 is too large, lights incident at a wide range of incident angles are scattered such that the light directivity of the optical film 101 may be too low. Accordingly, in an exemplary embodiment, the refractive-index difference among the light transmissive matrix 110 and the first and the second rods 121 and 122 may be in a range of about 0.001 to about 0.5 to obtain effective light directivity and light scattering characteristics of the optical film 101. In one exemplary embodiment, for example, a refractive index of the light transmissive matrix 110, a refractive index of the first rod 121, and a refractive index of the second rod 122 may satisfy the following Inequations 1 and 2.

[Inequation 1]

$$0.01 \leq |n1-n2| \leq 0.5$$

[Inequation 2]

$$0.01 \leq |n1-n3| \leq 0.5$$

Herein, n1 denotes the refractive index of the light transmissive matrix 110, n2 denotes the refractive index of the first rod 121, and n3 denotes the refractive index of the second rod 122.

In one exemplary embodiment, for example, the refractive-index difference among the light transmissive matrix 110 and the first and second rods 121 and 122 may be in a range of about 0.001 to about 0.04.

The light transmissive matrix 110 may have a refractive index in a range of about 1.4 to about 1.6, and each of the first rod 121 and the second rod 122 may have a refractive index in a range of about 1.45 to about 2.1.

The refractive indices of the light transmissive matrix 110, the first rod 121 and the second rod 122 may vary based on a method of manufacturing the optical film 101 and a photopolymerizable composition for forming the light transmissive matrix 110, the first rod 12, and the second rod 122.

According to an exemplary embodiment, the light transmissive matrix 110 may have a thickness t1 in a range of about 100 micrometers (μm) to about 200 μm.

Accordingly, in such an embodiment, the optical film 101 may have a thickness in a range of about 100 μm to about 200 μm. In the case that the thickness of the optical film 101 is less than about 100 μm, the optical film 101 may not achieve stable mechanical characteristics, the forming of the first rod 121 and the second rod 122 may become relatively difficult, and the first rod 121 and the second rod 122 may not readily achieve light directivity. In the case that the thickness of the optical film 101 is greater than about 200 μm, flexibility of the optical film 101 is lowered and a device including the optical film 101 may not readily achieve slimness.

In such an embodiment, lengths of the first rod 121 and the second rod 122 may be determined based on the thickness t1 of the light transmissive matrix 110.

Referring to FIGS. 3A and 3B, the first rods 121 and second rods 122 extend from the surface 110a of the light transmissive matrix 110 to an opposing surface 110b (e.g., a lower surface) thereof. The lengths of the first rod 121 and the second rod 122 may be greater than or equal to the thickness t1 of the light transmissive matrix 110. The first rod 121 and the second rod 122 may each have a length in a range of about 100 μm to about 200 μm.

The first rods 121 may have a transverse width, e.g., a diameter d1, in a range of about 1 μm to about 3 μm, and the second rods 122 may have transverse width, e.g., a diameter d2, in a range of about 1 μm to about 3 μm.

The first rods 121 are spaced apart from one another by a distance in a range of about 1 μm to about 2 μm, and the second rods 122 are spaced apart from one another by a distance in a range of about 1 μm to about 2 μm.

In an exemplary embodiment, a disposition interval (i.e., a pitch) of the first rods 121, that is, a pitch P1 between two adjacent ones of the first rods 121, is in a range of about 3.5 μm to about 4.5 μm. In an exemplary embodiment, a disposition interval (i.e., a pitch) of the second rods 122, that is, a pitch P2 between two adjacent ones of the second rods 122, is in a range of about 3.5 μm to about 4.5 μm.

Referring to FIGS. 1 and 2, a row of the first rod 121 and a row the second rod 122 that are adjacent to each other are spaced apart from one another along the column direction by a distance in a range of about 1 μm to about 2 μm.

However, an exemplary embodiment is not limited thereto, and the size and pitch of the first rod 121 and the second rod 121 may be variously modified based on the type of the optical film 101.

The light transmissive matrix 110 includes a light transmissive resin. The light transmissive matrix 110 may include at least one selected from a polyester-based resin, an acrylic resin, a cellulose-based resin, a polyolefin-based resin, a polyvinyl chloride-based resin, a polycarbonate-based resin, a phenolic resin and a urethane-based resin, for example.

In an exemplary embodiment, the first rod 121 and the second rod 122 may include or be formed of a same material as each other. In an exemplary embodiment, the first rod 121 and the second rod 122 may include or be formed of the same material as that of the light transmissive matrix 110.

In one exemplary embodiment, for example, the first rod 121, the second rod 122 and the light transmissive matrix 110 may include or be formed of a same photopolymerizable composition. Through light irradiation and curing of the photopolymerizable composition in a selective manner, the first rod 121 and the second rod 122 which are different from the light transmissive matrix 110 may be manufactured.

Hereinafter, the photopolymerizable composition forming the optical film 101 that includes the first rod 121, the second rod 122 and the light transmissive matrix 110 will be described. As used herein, the photopolymerizable composition forming the optical film 101 is referred to as "photopolymerizable composition."

In an exemplary embodiment, the photopolymerizable composition may include a polyfunctional monomer, a monofunctional monomer, a non-polymerizable compound, and a photopolymerization initiator.

The polyfunctional monomer includes a (meth) acrylic monomer including a (meth) acryloyl group, a vinyl group or an allyl group, for example.

In one exemplary embodiment, for example, the polyfunctional monomer may include triethylene glycol di (meth) acrylate, polyethylene glycol di (meth) acrylate, neopentyl glycol di (meth) acrylate, 1,4-butanediol (meth) acrylate, 1,6-hexanediol di (meth) acrylate, pentadienyl acrylate, bisphenol A di (meth) acrylate, trimethylolpropane tri (meth) acrylate, pentaerythritol tetra (meth) acrylate, tetramethylolmethane tetra (meth) acrylate, pentaerythritol hexa (meth) acrylate, polyfunctional epoxy (meth) acrylate, polyfunctional urethane (meth) acrylate, divinylbenzene, triallyl cyanurate, triaryl isocyanurate, triaryl trimellitate, N,N'-m-phenylene bismaleimide, diallyl phthalate, or a combination thereof In an exemplary embodiment, the polyfunctional monomer has a bridge structure and thus may solely be polymerized into a pillar-shaped structure to form the first rod 121 and the second rod 122. In an exemplary embodiment, the polymer including the polyfunctional monomer may have a density difference due to a difference in degree of polymerization, and thus may have a refractive-index difference based on the difference in degree of polymerization. Through the polymerization of the polyfunctional monomer, the first rod 121 and the second rod 122 may be formed.

In an exemplary embodiment, the photopolymerizable composition may include two or more kinds of a polyfunctional monomer, a polyfunctional oligomer, a polymer, or a low-molecular-weight compound to impart an effective refractive-index difference among the light transmissive matrix 110 and the first and second rods 121 and 122. In such an embodiment, materials having a relatively great refractive-index difference may be used in combination with each other.

The polyfunctional monomer may be included in an amount of about 20 wt % to about 70 wt % based on the total weight of the photopolymerizable composition.

In an exemplary embodiment, the photopolymerizable composition includes a monofunctional monomer that includes one polymerizable carbon-carbon double bond in a molecule. In one exemplary embodiment, for example, the monofunctional monomer may include materials including a (meth) acrylic monomer, a vinyl group or an allyl group.

In one exemplary embodiment, for example, the monofunctional monomer may include: (meth) acrylate compounds such as methyl (meth) acrylate, tetrahydrofuryl (meth) acrylate, ethyl carbitol (meth) acrylate, dicyclopentenyl oxyethyl (meth) acrylate, isobornyl (meth) acrylate, phenyl carbitol (meth) acrylate, nonyl phenoxy ethyl (meth) acrylate, 2-hydroxy-3-phenoxypropyl (meth) acrylate, (meth) acryloyloxyethyl succinate, (meth) acryloyl oxyethyl phthalate, phenyl (meth) acrylate, cyanoethyl (meth) acrylate, tribromo phenyl (meth) acrylate, phenoxyethyl (meth) acrylate, tribromo phenoxyethyl (meth) acrylate, benzyl (meth) acrylate, p-bromobenzyl (meth) acrylate, 2-ethylhexyl (meth) acrylate, lauryl (meth) acrylate, trifluoroethyl (meth) acrylate, and 2,2,3,3-tetrafluoro-propyl (meth) acrylate; vinyl compounds such as styrene, p-chlorostyrene, vinyl acetate, acrylonitrile, N-vinylpyrrolidone and vinylnaphthalene; and aryl compounds such as ethylene glycol bis allyl carbonate, diallyl phthalate and diallyl isophthalate.

The monofunctional monomer may be polymerized to form the light transmissive matrix 110. A monofunctional oligomer may be used along with the monofunctional monomer.

The content of the polyfunctional monomer may be adjusted in consideration of a bonding force among the light transmissive matrix 110 and the first and second rods 121 and 122, and the flexibility of the optical film 101. The monofunctional monomer may be included in an amount of about 10 wt % to about 70 wt % based on the total weight of the photopolymerizable composition, for example, in an amount of about 10 wt % to about 50 wt %.

The polymerizable composition may include a non-polymerizable compound that does not include a polymerizable carbon-carbon double bond.

In one exemplary embodiment, for example, the non-polymerizable compound may include polystyrene, poly(methyl methacrylate), polyethylene oxide, polyvinylpyrrolidone, polyvinyl alcohol, nylon, toluene, n-hexane, cyclohexane, acetone, methyl ethyl ketone, methyl alcohol, ethyl alcohol, ethyl acetate, acetonitrile, dimethylacetamide, dimethylformamide, tetrahydrofuran, organic halogen compounds, organic silicon compounds, plasticizers, or stabilizers.

The non-polymerizable compound adjusts viscosity of the photopolymerizable composition to improve handling of the photopolymerizable composition. The non-polymerizable compound may be included in an amount of about 1 wt % to about 50 wt % based on the total weight of the photopolymerizable composition. In such an embodiment, the content of the non-polymerizable compound may be controlled, e.g., increased or decreased, to improve handling and liquidity of the photopolymerizable composition and to facilitate the forming of the first rod 121 and the second rod 122 that have a pillar shape and are regularly arranged.

The photopolymerizable composition includes a photopolymerization initiator. The photopolymerization initiator may use a photopolymerization initiator, commonly used in the pertinent art, which responses to activation energy rays to initiate polymerization. In one exemplary embodiment, for example, the photopolymerization initiator may include benzophenone, benzyl, 2-chloro thioxanthone, benzoin methyl ether, diethoxyacetophenone, p-t-butyl trichloro acetophenone, benzyl dimethyl ketal, 2-hydroxy-2-methyl propyl phenone, or 1-hydroxycyclohexyl phenyl ketone.

The photopolymerization initiator is included in an amount of about 0.001 wt % to about 10 wt % based on the total weight of the photopolymerizable composition. In an exemplary embodiment, the photopolymeriation initiator may be included in an amount of about 0.01 wt % to about 5 wt % based on the total weight of the photopolymerizable composition to effectively prevent degradation in transparency of the optical film 101.

The photopolymerizable composition may further include an ultraviolet ("UV")-ray absorber. Since curing of the photopolymerizable composition is performed by UV-ray irradiation, an amount of the UV-ray absorber is limited to a range which may not degrade curing properties of the photopolymerizable composition.

The UV-ray absorber may be included in an amount of about 0.01 wt % to about 2 wt % based on the total weight of the photopolymerizable composition. In the case that the amount or content of the UV-ray absorber is too small, e.g., less than about 0.01 wt %, the effect of improving optical properties is degraded, and in the case that the amount or content of the UV-ray absorber is too large, e.g., greater than about 2 wt %, the curing characteristics of the photopolymerizable composition is degraded.

The UV-ray absorber is a compound that absorbs light in the UV range. In one exemplary embodiment, for example, the UV-ray absorber may include benzophenone-based compounds, phenyl benzotriazole-based compounds, or hydroxybenzoate-based compounds. In one exemplary embodiment, for example, the benzophenone-based compounds may include 2,4-dihydroxy-benzophenone, 2-hydroxy-4-methoxybenzophenone, or 2-hydroxy-4-octyloxybenzophenone. In one exemplary embodiment, for example, the phenyl benzotriazole-based UV absorber may include 2-(2-hydroxy-5-methylphenyl) benzotriazole, 2-[2-hydroxy-3-(3,4,5,6-tetrahydro-phthalimide methyl)-5-methyl phenyl] benzotriazole, 2-(2-hydroxy-3-tert-butyl-5-methylphenyl)-5-chlorobenzotriazole, or 2-(2-hydroxy-4-octyloxyphenyl) benzotriazole. In one exemplary embodiment, for example, the hydroxybenzoate-based UV absorber may include 2,4-di-tert-butylphenyl 3,5-di-tert-butyl-4-hydroxybenzoate.

In an exemplary embodiment, the optical film 101 may be manufactured in a manner in which the photopolymerizable composition is coated on a base in a film-like shape or a plate-like shape and collimated light having a predetermined inclination angle is irradiated thereto in a selective manner to cure the photopolymerizable composition in a selective manner. The method of manufacturing the optical film 101 will be described later in greater detail.

Figure 4:
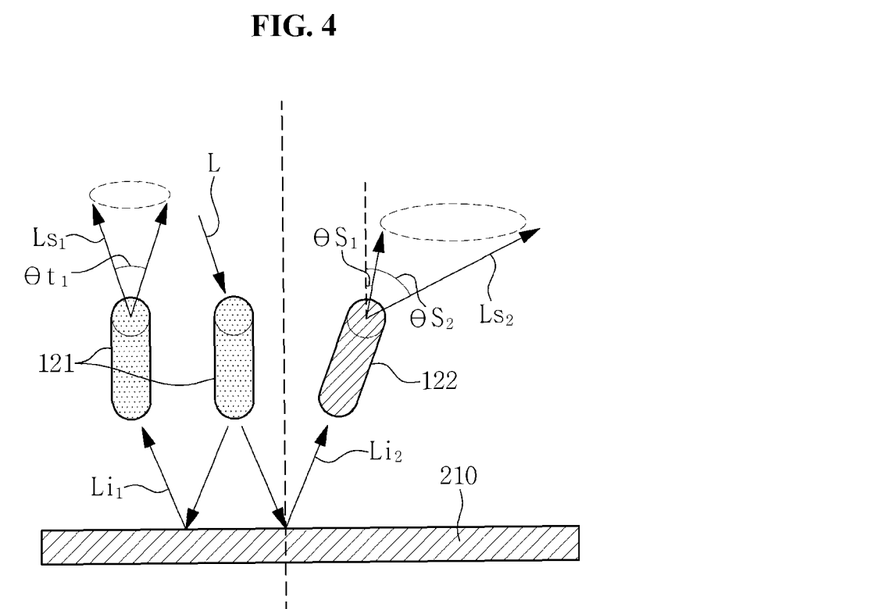
FIG. 4 is a schematic view illustrating light directivity and light diffusivity of the optical film.

FIG. 4 is a schematic view illustrating light directivity and light diffusivity of the optical film.

Referring to FIG. 4, a light L incident to the optical film 101 may be transmitted through the first rod 121 and then may be reflected by a reflection layer 210 to be incident to the first rod 121 and the second rod 122.

A light Li1 reflected and incident to the first rod 121 is output along a major-axis direction ax1 of the first rod 121. A light Ls1 output from the first rod 121 has a predetermined diffusion angle θt1. In the case that the major-axis direction ax1 of the first rod 121 is defined as a front direction (θ1=0°), the light Ls1 output from the first rod 121 has directivity toward the front direction and has diffusivity by the diffusion angle θt1.

A light Li2 reflected and incident to the second rod 122 is output along a major-axis direction ax2 of the second rod 122. A light Ls2 output from the second rod 122 may have a light diffusion start angle θs1 and a light diffusion end angle θs2 with respect to the front direction. The light Ls2 output from the second rod 122 has directivity toward the major-axis direction ax2 of the second rod 122 and has diffusivity by an angle difference between the light diffusion start angle θs1 and the light diffusion end angle θs2, that is, θs2−θs1.

Figure 5:
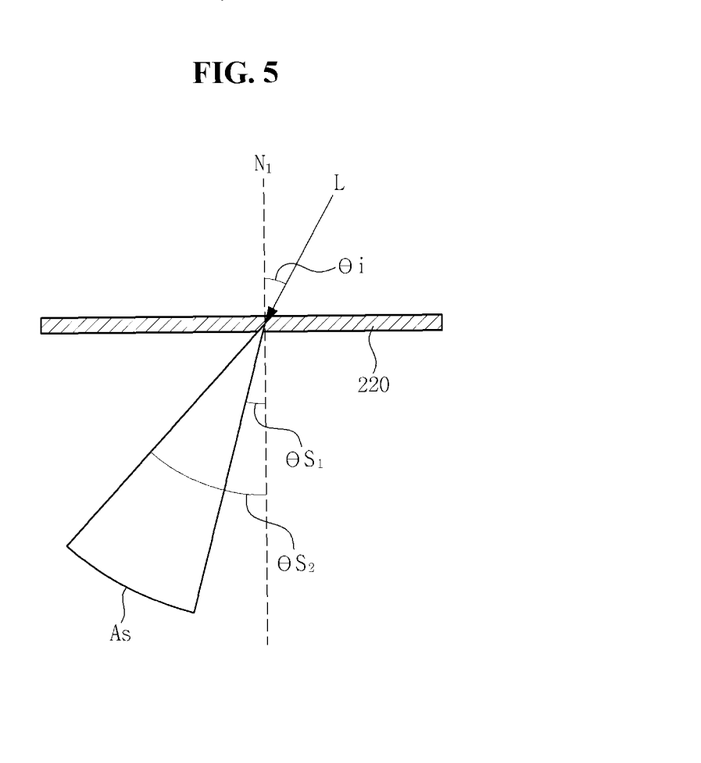
FIG. 5 is a schematic view illustrating a light diffusion angle of the optical film.

FIG. 5 is a schematic view illustrating a light diffusion angle of the optical film.

Referring to FIG. 5, θi denotes an incident angle of a light L that is incident to a medium 220, θs1 denotes a light diffusion start angle, and θs2 is a light diffusion end angle. Herein, the angle difference between the light diffusion start angle θs1 and the light diffusion end angle θs2, i.e., θs2−θs1, is referred to as a light diffusion area angle As.

In an exemplary embodiment, the optical film 101 including the first rod 121 and the second rod 122 has both of the light diffusivity and the light directivity. Such an embodiment of the optical film 101 may be referred to as a light control film.

In an exemplary embodiment, one of the first rod 121 and the second rod 122 is disposed to be parallel to a direction of the incident light, and the other of the first rod 121 and the second rod 122 is disposed to be parallel to a line of sight of a user, such that light efficiency of a reflective display device that utilizes reflection of incident light may be improved and visibility of light transmitted through the optical film 101 may be improved. In such an embodiment, in the case that such an optical film 101 is used in a display device, a blurring phenomenon in which an image displayed through the optical film 101 appears blurred or smudged may be substantially reduced or effectively prevented.

According to an exemplary embodiment, since the first rod 121 and the second rod 122 are disposed in a single light-transmissive matrix 110, the optical film 101 may have a small thickness and improved screen-blurring-prevention characteristics as compared to those of an optical film in which the first rod 121 and the second rod 122 are stacked one on another.

Hereinafter, an alternative exemplary embodiment of the optical film will be described with reference to FIGS. 6, 7 and 8.

Figure 6:
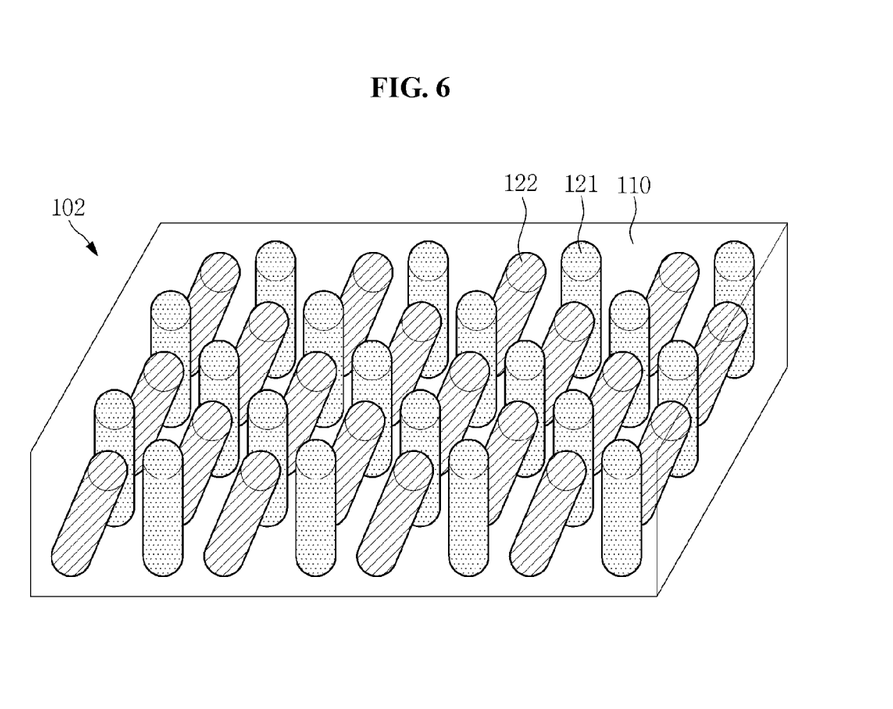
FIG. 6 is a perspective view illustrating an alternative exemplary embodiment of the optical film.
Figure 7:
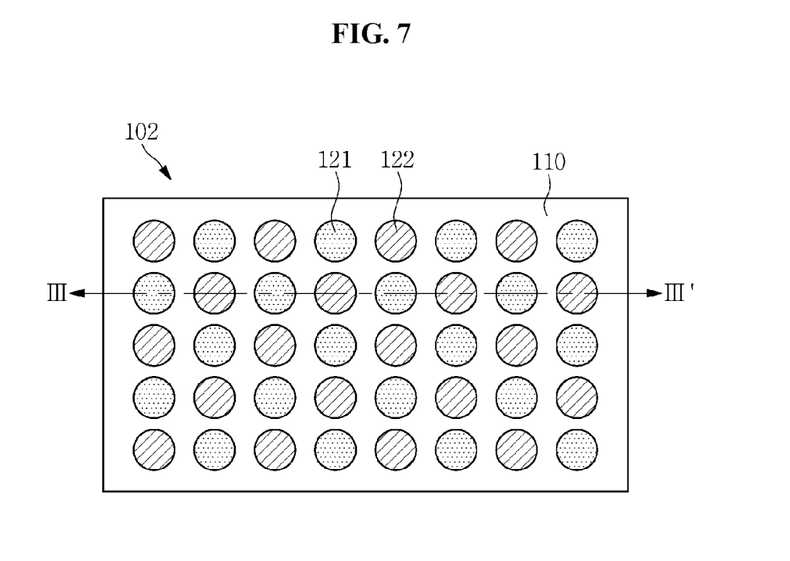
FIG. 7 is a plan view illustrating the optical film of FIG. 6.
Figure 8:
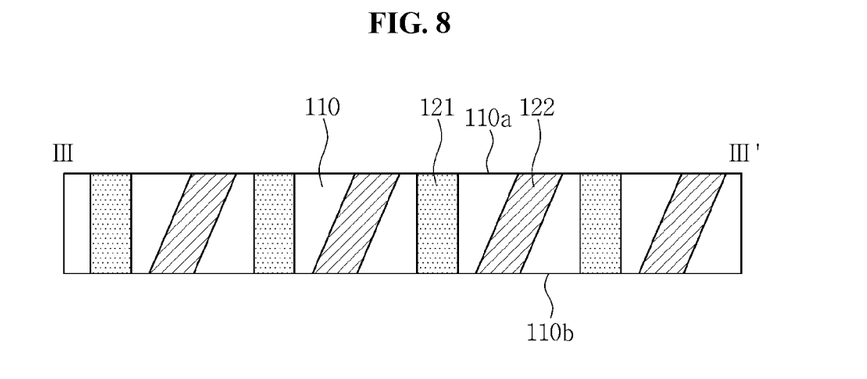
FIG. 8 is a cross-sectional view taken along line III-III' of FIG. 7.

FIG. 6 is a perspective view illustrating an alternative exemplary embodiment of the optical film 102, FIG. 7 is a plan view illustrating the optical film 102 of FIG. 6, and FIG. 8 is a cross-sectional view taken along line of FIG. 7.

Referring to FIGS. 6 and 7, in an exemplary embodiment of the optical film 102, a plurality of first rods 121 and a plurality of second rods 122 are disposed alternately along the column direction in a light transmissive matrix 110. In such an embodiment, the first rods 121 and the second rods 122 are disposed alternately along the row direction in the light transmissive matrix 110.

The optical film 102 including the first rods 121 and the second rods 122 that are regularly arranged has improved light directivity and light diffusivity.

The first rod 121, the second rod 122 and the light transmissive matrix 110 are substantially the same as those of the exemplary embodiments described above, and any repetitive detailed descriptions thereof will be omitted.

Hereinafter, another alternative exemplary embodiment of the optical film will be described with reference to FIG. 9.

Figure 9:
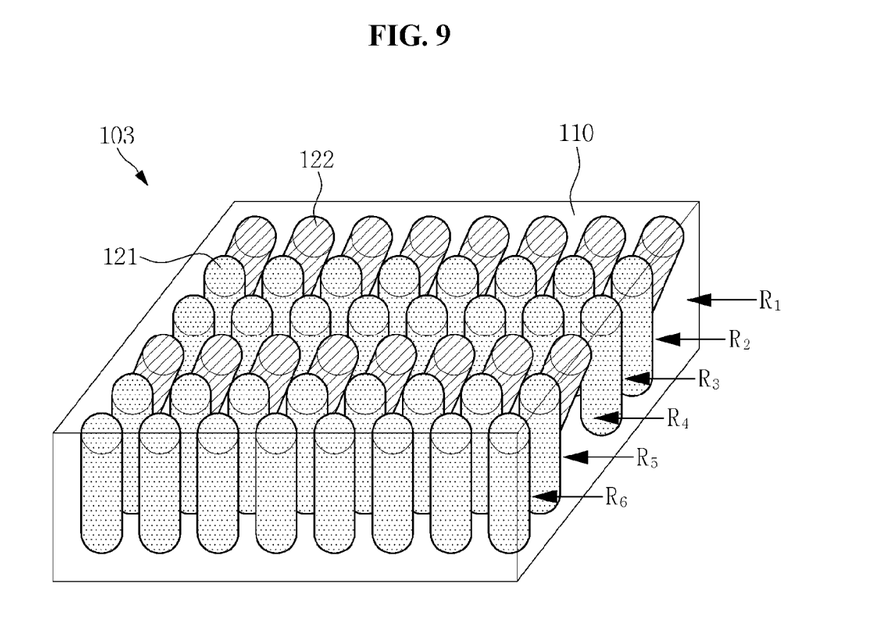
FIG. 9 is a perspective view illustrating another alternative exemplary embodiment of the optical film.

FIG. 9 is a perspective view illustrating another alternative exemplary embodiment of the optical film 103.

Referring to FIG. 9, in an exemplary embodiment of the optical film 103, a row of a plurality of second rods 122 is disposed in a row, e.g., a first row R1, a row of a plurality of first rods 121 is disposed in another row, e.g., a next row or a second row R2. In such an embodiment, another row of the first rods 121 is disposed in another row, e.g., a next row or a third row R3, and another row of the second rods 122 is disposed in another row, e.g., a next row or a fourth row R4. In such an embodiment, another two rows of the first rods 121 are disposed in other rows, e.g., next two rows or fifth and sixth rows R5 and R6.

In such an embodiment of the optical film 103, the number of the first rods 121 is greater than the number of the second rods 122, and thus light directivity toward a major-axis direction ax1 of the first rod 121 may be further improved.

Hereinafter, another alternative exemplary embodiment of the optical film will be described with reference to FIG. 10.

Figure 10:
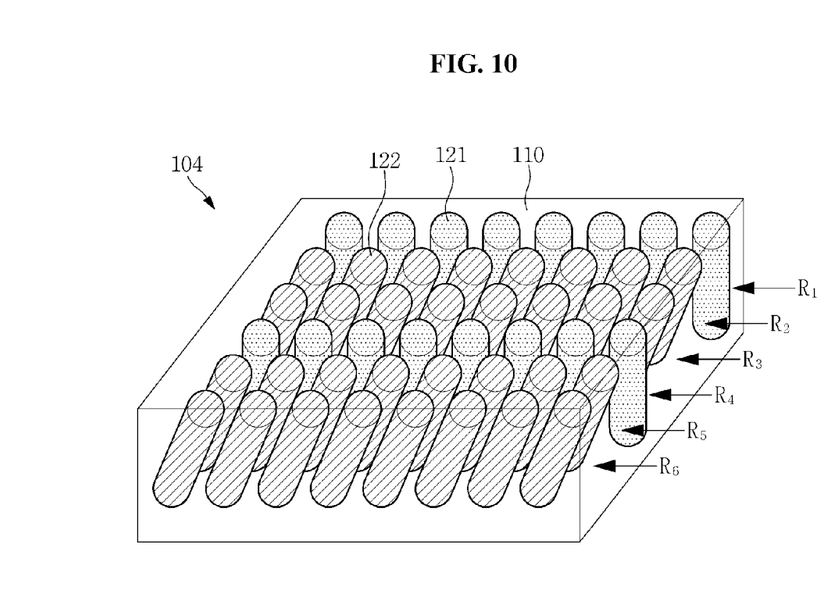
FIG. 10 is a perspective view illustrating another alternative exemplary embodiment of the optical film.

FIG. 10 is a perspective view illustrating another alternative exemplary embodiment of the optical film 104.

Referring to FIG. 10, a row of a plurality of first rods 121 is disposed in a row, e.g., a first row R1, a row of a plurality of second rods 122 is disposed in another row, e.g., a next row or a second row R2. In such an embodiment, another row of the second rods 122 is disposed in another row, e.g., a next row or a third row R3, and another row of the first rods 121 is disposed in another row, e.g., a next row or a fourth row R4. In such an embodiment, another two rows of the second rods 122 are disposed in other rows, e.g., next two rows or fifth and sixth rows R5 and R6.

In such an embodiment of the optical film 104, the number of the second rods 122 is greater than the number of the first rods 121, and thus light directivity toward a major-axis direction ax2 of the second rod 122 may be further improved.

Configurations of exemplary embodiments of the optical film are not limited to those described herein, and may be variously modified based on disposition of the first rod 121 and the second rod 122.

Hereinafter, an exemplary embodiment of a method of manufacturing the optical film 101 of FIG. 1 will be described with reference to FIGS. 11A, 11B, and 11C.

Figure 11A:
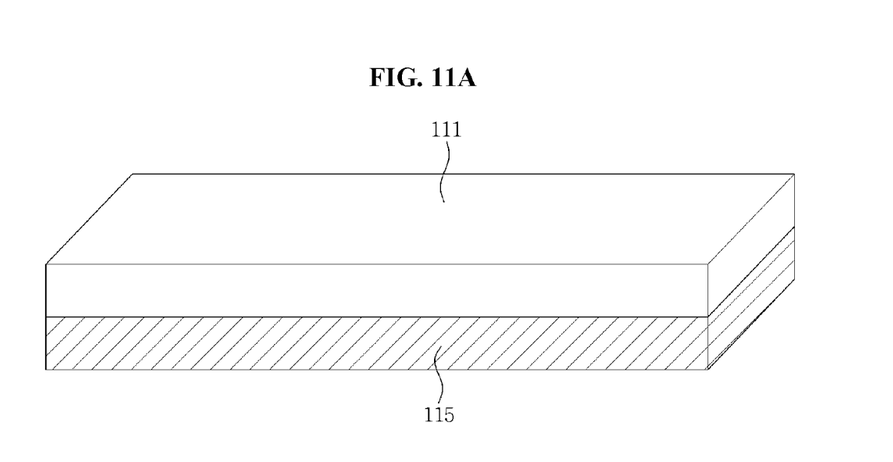
FIGS. 11A, 11B, and 11C are views illustrating an exemplary embodiment of a method of manufacturing the optical film of FIG. 1.

Referring to FIG. 11A, in an exemplary embodiment of a method of manufacturing the optical film 101, a photopolymerizable composition 111 is coated on a base 115 in a film-like shape. Herein, a plastic sheet having release properties may be used as the base 115.

The photopolymerizable composition 111 coated on the base 115 may be a photopolymerizable composition for forming the optical film 101. The photopolymerizable composition 111 may include a polyfunctional monomer, a monofunctional monomer, a non-polymerizable compound, and a photopolymerization initiator. The photopolymerizable composition 111 is substantially the same as that described hereinabove, and thus any repetitive detailed descriptions thereof will be omitted.

In such an embodiment, light is irradiated to the photopolymerizable composition 111 using a light source, such that the photopolymerizable composition 111 is cured. The light source includes a first light irradiating apparatus 311 and a second light irradiating apparatus 312, and each of the first light irradiating apparatus 311 and the second light irradiating apparatus 312 irradiates a plurality of dot-type collimated light.

Figure 11B:
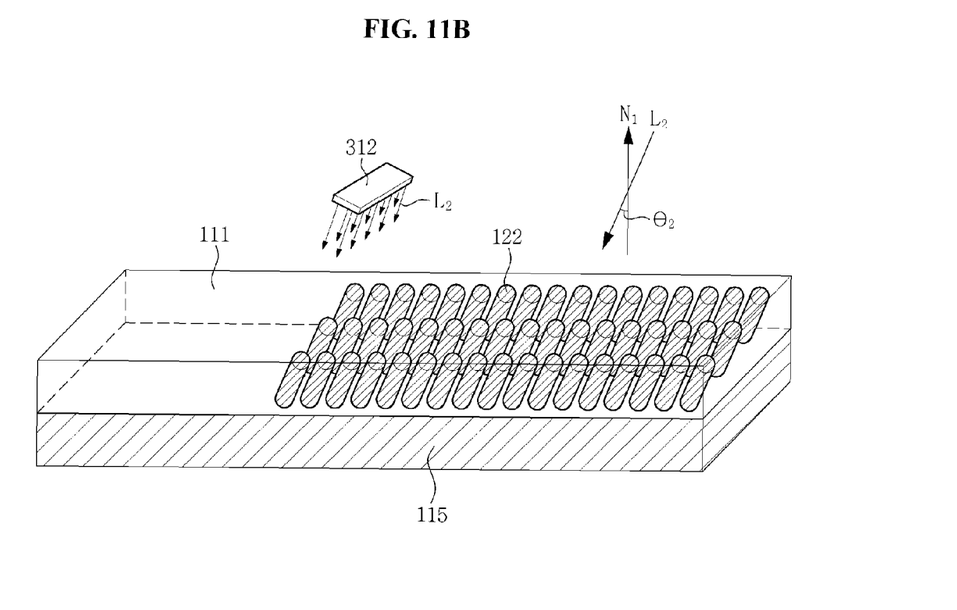

In one exemplary embodiment, for example, referring to FIG. 11B, a light L2 is irradiated to the photopolymerizable composition 111 using the second light irradiating apparatus 312. A portion of the photopolymerizable composition 111 is cured in a selective manner by light irradiation using the second light irradiating apparatus 312 such that a plurality of second rods 122 is formed. In an exemplary embodiment, a part of polyfunctional monomers of the photopolymerizable composition 111 are polymerized and cured in a selective manner such that the second rods 122 are formed.

An inclination angle of the light output from the second light irradiating apparatus 312 may be the same as or different from an inclination angle θ2 of the second rod 122. In consideration of a refractive index of the photopolymerizable composition 111, an irradiation angle of the second light irradiating apparatus 312 may be adjusted.

In one exemplary embodiment, for example, the second light irradiating apparatus 312 irradiates the light L2 having an inclination angle of about 5° to about 20° with respect to a normal line of a surface of the photopolymerizable composition 111. The second light irradiating apparatus 312 may include a plurality of point sources that output the collimated light. Accordingly, a plurality of dot-type collimated lights is irradiated from the second light irradiating apparatus 312.

Figure 11C:
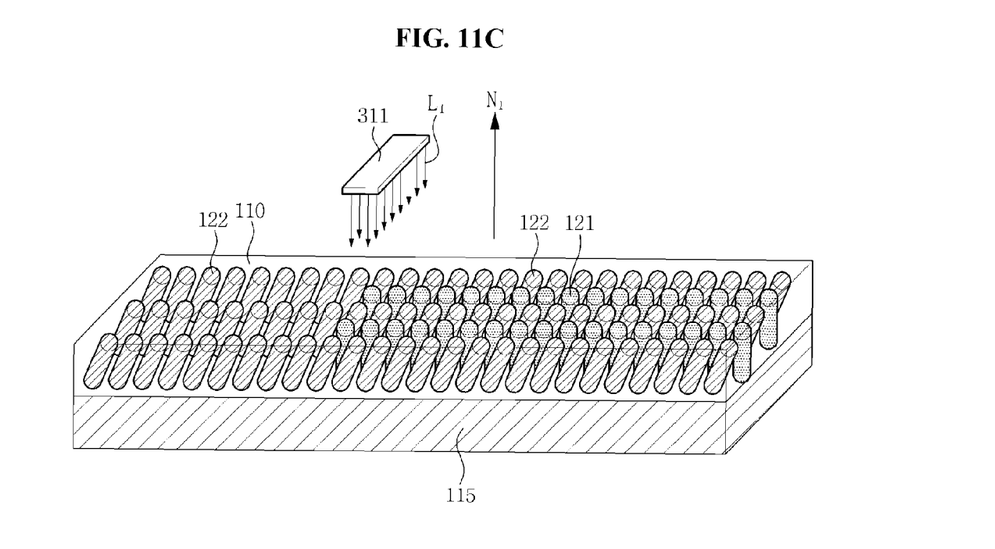

In such an embodiment, referring to FIG. 11C, a light L1 is irradiated to the photopolymerizable composition 111 using the first light irradiating apparatus 311. A portion of the photopolymerizable composition 111 is cured in a selective manner by light irradiation using the first light irradiating apparatus 311 such that a plurality of first rods 121 is formed. In an exemplary embodiment, a part of the polyfunctional monomers of the photopolymerizable composition 111 are polymerized and cured in a selective manner such that the first rods 121 are formed.

An inclination angle of the light output from the first light irradiating apparatus 311 may be the same as or different from an inclination angle θ1 of the first rod 121. In consideration of the refractive index of the photopolymerizable composition 111, an irradiation angle of the first light irradiating apparatus 311 may be adjusted.

In one exemplary embodiment, for example, the first light irradiating apparatus 311 irradiates the light L1 having an inclination angle of about 0° to about 5° with respect to a normal line of a surface (e.g., an upper surface) of the photopolymerizable composition 111. The first light irradiating apparatus 311 may include a plurality of point sources that outputs collimated light. Accordingly, a plurality of dot-type collimated lights is irradiated from the first light irradiating apparatus 311.

Although not illustrated, subsequent to the light irradiation by the first light irradiating apparatus 311, a curing, e.g., photo-curing or thermal curing, may further be performed.

In an exemplary embodiment, the order of the light irradiation by the first light irradiating apparatus 311 and the light irradiation by the second light irradiating apparatus 312 may vary. In an exemplary embodiment, subsequent to the light irradiation by the first light irradiating apparatus 311, the light irradiation by the second light irradiating apparatus 312 may be performed. In an alternative exemplary embodiment, the light irradiation by the first light irradiating apparatus 311 and the light irradiation by the second light irradiating apparatus 312 may be performed simultaneously.

Hereinafter, an embodiment of a display device will be described with reference to FIG. 12.

Figure 12:
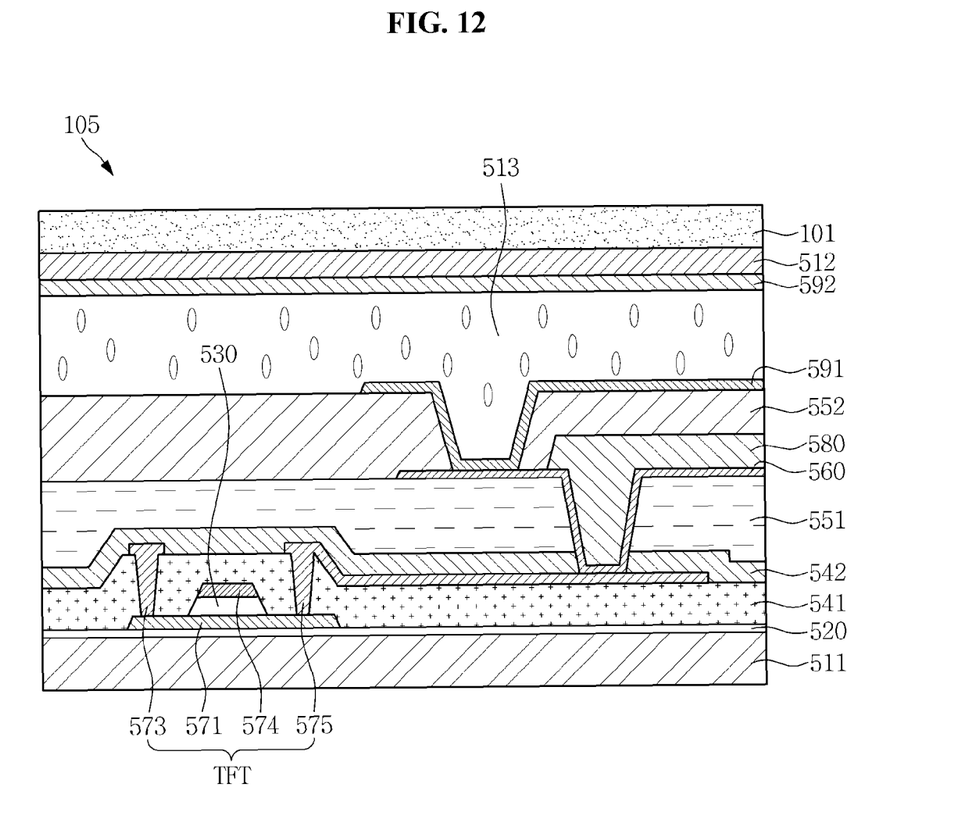
FIG. 12 is a cross-sectional view illustrating an exemplary embodiment of a display device.

FIG. 12 is a cross-sectional view illustrating an exemplary embodiment of a display device. In such an embodiment, the display device may be a liquid crystal display ("LCD") device 105.

In such an embodiment, the LCD device 105 includes a first substrate 511, a second substrate 512 opposing the first substrate 511, and a liquid crystal layer 513 between the first substrate 511 and the second substrate 512. In such an embodiment, the LCD device 105 includes an optical film 101 on a surface of the second substrate 512 to be opposite to the liquid crystal layer 513 with respect to the second substrate 512. In an exemplary embodiment, the optical film 101 may be the exemplary embodiments of the optical film 101 described herein.

The first substrate 511 may include an insulating material selected from glass, quartz, ceramic and plastic, for example, but not being limited thereto. Alternatively, the first substrate 511 may include a metal material such as stainless steel.

A buffer layer 520 may be disposed on the first substrate 511. The buffer layer 520 may include at least one of various inorganic layers and various organic layers. Alternatively, the buffer layer 520 may be omitted.

A thin film transistor ("TFT") may be disposed on the buffer layer 520.

In one exemplary embodiment, for example, a semiconductor layer 571 is disposed on the buffer layer 520, and a gate insulating layer 530 is disposed on the semiconductor layer 571. A gate electrode 574 may be disposed on the gate insulating layer 530. The gate electrode 574 may extend from a gate line (not illustrated).

An insulating interlayer 541 may be disposed on the gate electrode 574. The insulating interlayer 541 may include an organic layer or an inorganic layer that has insulating properties.

A source electrode 573 and a drain electrode 575 may be disposed on the insulating interlayer 541. In such an embodiment, the source electrode 573 and the drain electrode 575 are spaced apart from each other. Each of the source electrode 573 and the drain electrode 575 overlaps at least a portion of the semiconductor layer 571 and is connected to the semiconductor layer 571 through a contact hole defined in the insulating interlayer 541.

The source electrode 573 may extend from a data line (not illustrated), and the drain electrode 575 is electrically connected to a pixel electrode 591.

The semiconductor layer 571, the gate electrode 574, the source electrode 573 and the drain electrode 575 may collectively define the TFT.

A passivation layer 542 may be disposed on the source electrode 573 and the drain electrode 575. The passivation layer 542 and the insulating interlayer 541 may include a same material as each other.

A first protection layer 551 may be disposed on the passivation layer 542. The first protection layer 551 may be a monolayer or a multilayer that includes an organic layer or an inorganic layer. According to an exemplary embodiment, the first protection layer 551 may be an organic layer.

In such an embodiment, a portion of the passivation layer 542 and the first protection layer 551 is removed such that a contact hole exposing a portion of the drain electrode 575 is defined.

A reflection pattern 560 may be disposed on the first protection layer 551. The reflection pattern 560 is disposed in an area overlapping the pixel electrode 591, e.g., a pixel area. The reflection pattern 560 may include a metal. In one exemplary embodiment, for example, the reflection pattern 560 may include a reflection layer including aluminum (Ag) or silver (Ag).

The reflection pattern 560 may be connected to the drain electrode 575 through the contact hole defined in the passivation layer 542 and the first protection layer 551.

A color filter 580 may be disposed on the reflection pattern 560. The color filter 580 may expose at least a portion of the reflection pattern 560.

The color filter 580 may be one of a red filter, a green filter, and a blue filter, for example. However, such an embodiment is not limited thereto, and alternatively, the color filter 580 may be a white filter.

A second protection layer 552 may be disposed on the color filter 580. The second protection layer 552 may be a monolayer or a multilayer that includes an organic layer or an inorganic layer. The second protection layer 552 may include the same material as that of the first protection layer 551.

A portion of the second protection layer 552 may be removed such that a contact hole exposing a portion of the reflection pattern 560 is defined.

The pixel electrode 591 may be disposed on the second protection layer 552. The pixel electrode 591 may overlap the reflection pattern 560. The pixel electrode 591 may be connected to the reflection pattern 560 through the contact hole defined in the second protection layer 552, and electrically connected to the drain electrode 575 through the reflection pattern 560.

The pixel electrode 591 may include a transparent conductive oxide ("TCO") such as indium tin oxide ("ITO"), indium zinc oxide ("IZO"), and aluminum zinc oxide ("AZO").

The second substrate 512 may be disposed to oppose the first substrate 511, and the liquid crystal layer 513 is disposed between the first substrate 511 and the second substrate 512. A common electrode 592 may be disposed on the second substrate 512. A column spacer (not illustrated) for supporting the first substrate 511 and the second substrate 512 may be disposed between the first substrate 511 and the second substrate 512. In such an embodiment, a black matrix (not illustrated), configured to prevent light leakage, may be disposed on at least one of the first substrate 511 and the second substrate 512.

The optical film 101 may be disposed on a surface of the second substrate 512 that is opposite to the first substrate 511 such that the LCD device 105 is manufactured.

In an exemplary embodiment, the LCD device 105 is a reflective LCD device.

The reflective LCD device displays an image using natural light or external light that is incident thereto. In one exemplary embodiment, for example, the natural light or external light that is incident to the reflective LCD device is reflected by the reflection pattern 560 to be transmitted through the color filter 580 and the liquid crystal layer 513 to display an image.

The optical film 101 on the second substrate 512 has light directivity such that the optical film 101 may control an incident light path, control a path of the reflected light reflected by the reflection pattern 560, and diffuse the reflected light to improve light efficiency, such that the image burring phenomenon may be effectively prevented in the LCD device 105.

As set forth above, according to one or more exemplary embodiments, the optical film has high or improved light directivity, light diffusivity and blurring prevention characteristics. Thus, according to one or more exemplary embodiments, the display device including the optical film may have improved light efficiency and may display a clear image without blurring.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. An optical film comprising:
   a light-transmissive matrix having a plate shape;
   a plurality of first rods having a refractive index different from a refractive index of the light-transmissive matrix and disposed at a first inclination angle in the light-transmissive matrix; and
   a plurality of second rods having a refractive index different from the refractive index of the light-transmissive matrix and disposed at a second inclination angle in the light-transmissive matrix,
   wherein the first inclination angle is different from the second inclination angle.

2. The optical film of claim 1, wherein
   the first inclination angle is an angle of a major axis of the first rods with respect to a normal line of the light-transmissive matrix,
   the second inclination angle is an angle of a major axis of the second rods with respect to the normal line of the light-transmissive matrix,
   the first inclination angle is in a range of about zero degree to about 5 degrees, and
   the second inclination angle is in a range of about 5 degrees to about 20 degrees.

3. The optical film of claim 1, wherein the light-transmissive matrix has a thickness in a range of about 100 micrometers to about 200 micrometers.

4. The optical film of claim 1, wherein each of the first rods and the second rods extends from a surface of the light-transmissive matrix to an opposing surface thereof.

5. The optical film of claim 1, wherein
   a difference between the refractive index of the light-transmissive matrix and the refractive index of the first rods is in a range of about 0.001 to about 0.5, and
   a difference between the refractive index of the light-transmissive matrix and the refractive index of the second rods is in a range of about 0.001 to about 0.5.

6. The optical film as claimed in claim 1, wherein the refractive index of the first rods and the refractive index of the second rods are the same as each other.

7. The optical film of claim 1, wherein the first rods comprise a same material as a material of the second rods.

8. The optical film of claim 1, wherein each of the first rods and the second rods have a transverse width in a range of about 1 micrometer to about 3 micrometers.

9. The optical film of claim 1, wherein
   the first rods and the second rods are arranged in a matrix form,
   the first rods are arranged in a row, and
   the second rods are arranged in an adjacent row.

10. The optical film as claimed in claim 9, wherein the first rods have a pitch in a range of about 3 micrometers to about 5 micrometers.

11. The optical film of claim 1, wherein the first rods and the second rods are disposed alternately with each other along a predetermined direction.

12. A method of manufacturing an optical film, the method comprising:
    coating a photopolymerizable composition on a base; and
    irradiating light to the photopolymerizable composition using a light source and curing the photopolymerizable composition,
    wherein the light source comprises a first light irradiating apparatus and a second light irradiating apparatus,
    each of the first light irradiating apparatus and the second light irradiating apparatus irradiates a plurality of dot-type collimated lights,
    the first light irradiating apparatus irradiates the dot-type collimated lights to the photopolymerizable composition, and
    the dot-type collimated lights irradiated from the first light irradiating apparatus has an irradiation angle different from an irradiation angle of the dot-type collimated lights irradiated from the second light irradiating apparatus.

13. The method of claim 12, wherein
    the dot-type collimated lights irradiated from the first light irradiating apparatus has an inclination angle in a range of about zero degree to about 5 degrees with respect to a normal line of a surface of the coated photopolymerizable composition, and the dot-type collimated lights irradiated from the second light irradiating apparatus an inclination angle in a range of about 5 degrees to about 20 degrees with respect to the normal line of the surface of the coated photopolymerizable composition.

14. The method of claim 12, wherein the photopolymerizable composition comprises a polyfunctional monomer, a monofunctional monomer, a non-polymerizable compound, and a photopolymerization initiator.

15. A display device comprising:
a first substrate;
a second substrate opposing the first substrate;
a liquid crystal layer between the first substrate and the second substrate; and
an optical film on a surface of the second substrate to be opposite to the liquid crystal layer, wherein the optical film comprises:
a light-transmissive matrix having a plate shape and having a first refractive index;
a plurality of first rods having a second refractive index, which is different from the first refractive index, and dispersed in the light-transmissive matrix; and
a plurality of second rods having a third refractive index, which is different from the first refractive index, and dispersed in the light-transmissive matrix, and the first rod and the second rod have different inclination angles with respect to a normal line of the light-transmissive matrix.

16. The display device of claim 15, further comprising:
a reflection pattern on the first substrate to be opposite to the liquid crystal layer.

* * * * *